(12) United States Patent
Xue et al.

(10) Patent No.: US 11,061,934 B1
(45) Date of Patent: Jul. 13, 2021

(54) METHOD AND SYSTEM FOR CHARACTERIZING TIME SERIES

(71) Applicants: Zhicheng Xue, Mountain View, CA (US); Steve Shibuya, Mountain View, CA (US)

(72) Inventors: Zhicheng Xue, Mountain View, CA (US); Steve Shibuya, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 320 days.

(21) Appl. No.: 15/947,557

(22) Filed: Apr. 6, 2018

(51) Int. Cl.
| | | |
|---|---|---|
| *G06F 7/00* | (2006.01) | |
| *G06F 16/28* | (2019.01) | |
| *G06F 17/14* | (2006.01) | |
| *G06F 17/18* | (2006.01) | |
| *G06F 16/22* | (2019.01) | |
| *G06F 16/2458* | (2019.01) | |

(52) U.S. Cl.
CPC ........ *G06F 16/285* (2019.01); *G06F 16/2237* (2019.01); *G06F 16/2477* (2019.01); *G06F 17/14* (2013.01); *G06F 17/18* (2013.01)

(58) Field of Classification Search
CPC .............. G06F 16/285; G06F 16/2477; G06F 16/2237; G06F 17/14; G06F 17/18; G06F 11/3072; G06F 11/3075; G06F 11/3082; G06F 16/35; G06F 16/355; G06F 16/45
See application file for complete search history.

(56) References Cited

U.S. PATENT DOCUMENTS

| | | | | |
|---|---|---|---|---|
| 7,848,946 | B2 * | 12/2010 | Acharya | G06Q 30/0202 705/7.31 |
| 8,010,404 | B1 * | 8/2011 | Wu | G06Q 30/02 705/1.1 |
| 2002/0072957 | A1 * | 6/2002 | Thompson | G06Q 10/063 705/7.29 |

(Continued)

OTHER PUBLICATIONS

STL: A seasonal-trend decomposition procedure based on Loess; Robert B. Cleveland, William S. Cleveland, Jean E McRae, and Irma Terpenning; Journal of official Statistics; Sweden; 1990; (Year: 1990).*

(Continued)

*Primary Examiner* — Mohammed R Uddin
(74) *Attorney, Agent, or Firm* — Ferguson Braswell Fraser Kubasta PC (57) ABSTRACT

The invention relates to a method for characterizing time series. The method includes obtaining a time series that includes data points for consecutive time intervals, decomposing the time series into a trend component, a seasonal component, and a residual component, and clustering the seasonal component into a number of clusters. Each of the consecutive time intervals is assigned to one of the clusters based on a level of the data points of the seasonality component in the time interval. The method further includes labeling one of the clusters as baseline with the baseline cluster containing more time intervals than any one of the other clusters, determining cluster labels for the other clusters based on the level of the data points of the time intervals assigned to the other clusters; and for each time interval, storing the corresponding cluster label in a vector.

20 Claims, 7 Drawing Sheets

(56) References Cited

U.S. PATENT DOCUMENTS

| | | | | |
|---|---|---|---|---|
| 2005/0234718 | A1* | 10/2005 | Ouimet | G06Q 10/04 704/241 |
| 2009/0012848 | A1* | 1/2009 | Brooks | G06Q 30/02 705/7.29 |
| 2009/0172035 | A1* | 7/2009 | Lessing | G06F 16/284 |
| 2010/0088154 | A1* | 4/2010 | Vailaya | G06Q 10/04 705/7.29 |
| 2010/0138273 | A1* | 6/2010 | Bateni | G06Q 30/02 705/7.31 |
| 2010/0262901 | A1* | 10/2010 | DiSalvo | G06Q 40/04 715/227 |
| 2011/0208701 | A1* | 8/2011 | Jackson | G06Q 10/10 707/687 |
| 2012/0303411 | A1* | 11/2012 | Chen | G06Q 10/087 705/7.31 |
| 2015/0019295 | A1* | 1/2015 | Natarajan | G06Q 30/0206 705/7.35 |
| 2015/0356137 | A1* | 12/2015 | Andros | G06F 16/2453 707/715 |
| 2016/0019271 | A1* | 1/2016 | Ma | G06Q 30/00 707/756 |
| 2016/0180556 | A1* | 6/2016 | Deng | G06F 16/26 345/440 |
| 2016/0342910 | A1* | 11/2016 | Chu | G06T 11/206 |
| 2017/0032406 | A1* | 2/2017 | Moran | G06Q 30/0244 |
| 2017/0061297 | A1* | 3/2017 | Joshi | G06N 5/04 |
| 2017/0116658 | A1* | 4/2017 | Baid | G06Q 30/0625 |
| 2017/0124466 | A1* | 5/2017 | Li | G06Q 10/04 |
| 2017/0132396 | A1* | 5/2017 | Bechtold | G16H 50/20 |
| 2017/0206592 | A1* | 7/2017 | Chen | G06Q 30/0635 |
| 2017/0249562 | A1* | 8/2017 | Garvey | G06N 20/00 |
| 2017/0364803 | A1* | 12/2017 | Calmon | G06Q 30/0201 |
| 2018/0039898 | A1* | 2/2018 | Saini | G06F 11/3447 |
| 2018/0300737 | A1* | 10/2018 | Bledsoe | G06Q 30/0202 |
| 2018/0322400 | A1* | 11/2018 | Shahand | G06F 11/3409 |
| 2019/0034821 | A1* | 1/2019 | Dan | G06N 7/005 |

OTHER PUBLICATIONS

Cleveland, Robert B. et al., "STL: A Seasonal-Trend Decomposition Procedure Based on Loess"; Journal of Official Statistics, vol. 6, No. 1; Statistics Sweden; Mar. 1990 (31 pages).

Tibshirani, Robert et al., "Estimating the number of clusters in a data set via the gap statistic"; Journal of the Royal Statistical Society B, 63, Part 2; Stanford University, USA; pp. 411-423; Feb. 2001 (13 pages).

The X12 Procedure: Combined Test for the Presence of Identifiable Seasonality: <https://support.sas.com/documentation/cd1/en/etsug/63939/HTML/default/etsug_x12_sect029.htm>; Accessed Feb. 27, 2018 (2 pages).

* cited by examiner

METHOD AND SYSTEM FOR CHARACTERIZING TIME SERIES

BACKGROUND

Time series are used almost anywhere to represent processes. For example, a business may document sales or expenses over time, with periodically recorded data points forming a time series. Time series may contain useful information which, if extracted, can serve many purposes such as controlling processes, making decisions, performing predictions, etc.

SUMMARY

In general, in one aspect, one or more embodiments relate to a method for characterizing time series, comprising obtaining a time series comprising data points for a plurality of consecutive time intervals; decomposing the time series into a trend component, a seasonal component, and a residual component, the decomposing comprising performing a smoothing operation by: segmenting the time series into local subsets; and separately processing each of the local subsets by: loading the local subset into a memory; fitting a local model to the loaded local subset; wherein the local models establish an initial seasonal component from which the trend component, the seasonal component and the residual component are obtained; clustering the seasonal component into a number of clusters, wherein each of the plurality of consecutive time intervals is assigned to one of the clusters based on a level of the data points of the seasonality component in the time interval; labeling one of the clusters as baseline, wherein the baseline cluster comprises more time intervals than any one of the other clusters; determining cluster labels for the other clusters based on the level of the data points of the time intervals assigned to the other clusters; and for each time interval, storing the corresponding cluster label in a vector.

In general, in one aspect, one or more embodiments relate to a system for for characterizing time series, the system comprising a hardware processor and memory; and software instructions stored in the memory, which when executed by the hardware processor, cause the hardware processor to: obtain a time series comprising data points for a plurality of consecutive time intervals; decompose the time series into a trend component, a seasonal component, and a residual component; cluster the seasonal component into a number of clusters, wherein each of the plurality of consecutive time intervals is assigned to one of the clusters based on a level of the data points of the seasonality component in the time interval; label one of the clusters as baseline, wherein the baseline cluster comprises more time intervals than any one of the other clusters; and determine cluster labels for the other clusters based on the level of the data points of the time intervals assigned to the other clusters.

In general, in one aspect, one or more embodiments relate to a non-transitory computer readable medium including computer readable program code for causing a computer system to obtain a time series comprising data points for a plurality of consecutive time intervals; decompose the time series into a trend component, a seasonal component, and a residual component; cluster the seasonal component into a number of clusters, wherein each of the plurality of consecutive time intervals is assigned to one of the clusters based on a level of the data points of the seasonality component in the time interval; label one of the clusters as baseline, wherein the baseline cluster comprises more time intervals than any one of the other clusters; and determine cluster labels for the other clusters based on the level of the data points of the time intervals assigned to the other clusters.

Other aspects of the disclosure will be apparent from the following description and the appended claims.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide a method and a system for characterizing time series. Time series are used in almost any domain to document processes. For example, a business may document sales or expenses over time, based on periodically recorded data points forming a time series. Time series may contain useful information which, once extracted, can serve various purposes such as controlling processes, making decisions, performing predictions, etc. In one or more embodiments of the disclosure, a time series is decomposed into additive trend, seasonal and residual components. Subsequently, these separate components are reduced to a vector whose attributes characterize the time series using a compact representation. For example, the vector may characterize each month of a time series as maximum peak, intermediate peak, minimum trough, intermediate trough or baseline level. The compact representation of the characteristics of a time series, as obtained in accordance with one or more embodiments of the disclosure, may provide insightful information that is not necessarily directly available by inspection of the original time series.

In one or more embodiments of the disclosure, the trend component of a time series is a gradual change in the time series causing the data points to move in a certain direction over time, e.g., upward (positive trend) or downward (negative trend). For example, in a time series representing sales data of a growing business over multiple years, the trend component may show a positive trend.

In one or more embodiments of the disclosure, the seasonal component of a time series includes periodical fluctuations in the time series. For example, in the previously introduced example of a time series representing sales data, data points for the months of January-October may always be lower than data points for the month of November and December because the business is seasonal with more sales occurring during the holiday season.

In one or more embodiments of the disclosure, the residual component of a time series includes fluctuations in the time series that a captured by neither the trend component nor the seasonal component. The residual component may include, for example, fluctuations due to one-time events, measurement errors, noise in the documented process, etc.

In one or more embodiments of the disclosure, combining the trend component, the seasonal component and the residual component restores the time series. The combination may be performed additively or multiplicatively, depending on whether an additive or a multiplicative decomposition was performed.

The availability of the seasonal component may provide a thorough understanding of the time series and may enable or facilitate actions. For example, periodic fluctuations, once understood, may be used to predict future developments. Consider businesses that may experience seasonal fluctuations in sales, need for capital, etc. Recognizing this seasonality, described by the seasonal component, may enable anticipatory actions to accommodate the seasonality and/or to maximally benefit from the seasonality.

Referring, again to the previously introduced example of the seasonal business, assume, for example, that the business sells gingerbread. And the time series therefore shows pronounced, reproducible seasonal peaks in November and December, while being otherwise comparably flat. The seasonality of time series would be expressed by arranging the months January-October in a cluster labeled, for example, "off-peak sales", while assigning the months November and December to another cluster labeled "peak sales".

As the example illustrates, the seasonal component, in accordance with one or more embodiments of the disclosure, is clustered based on time intervals such as months. Each cluster, in accordance with an embodiment of the disclosure, represents a different level of the seasonality in the seasonal component. Accordingly, clusters may be generated for time intervals when the seasonal component is low, intermediate or high, etc. Each cluster may then receive a cluster label. A cluster label may be specific to the data that the time series represents. For example, in the case of sales data, labels may be "low sales", "high sales", "peak sales" and "average sales", etc., whereas in the case of rainfall data, labels may be "dry season" and "rain season". Based on each month (or broadly speaking, each time interval) being labeled using a cluster label, the seasonality data obtained from the time series is easy to read and understand.

While the subsequent discussion is primarily based on time series with an annually repeating seasonality, other types of seasonality may be accommodated without departing from the disclosure. Specifically, the described methods and systems are applicable at any time scale. Further, embodiments of the disclosure are not limited to time series but may also be applied to other series, e.g., to assess spatially periodic series. Further, embodiments of the disclosure are applicable to any field including but not limited to business, management, finance, engineering and science.

Figure 1:
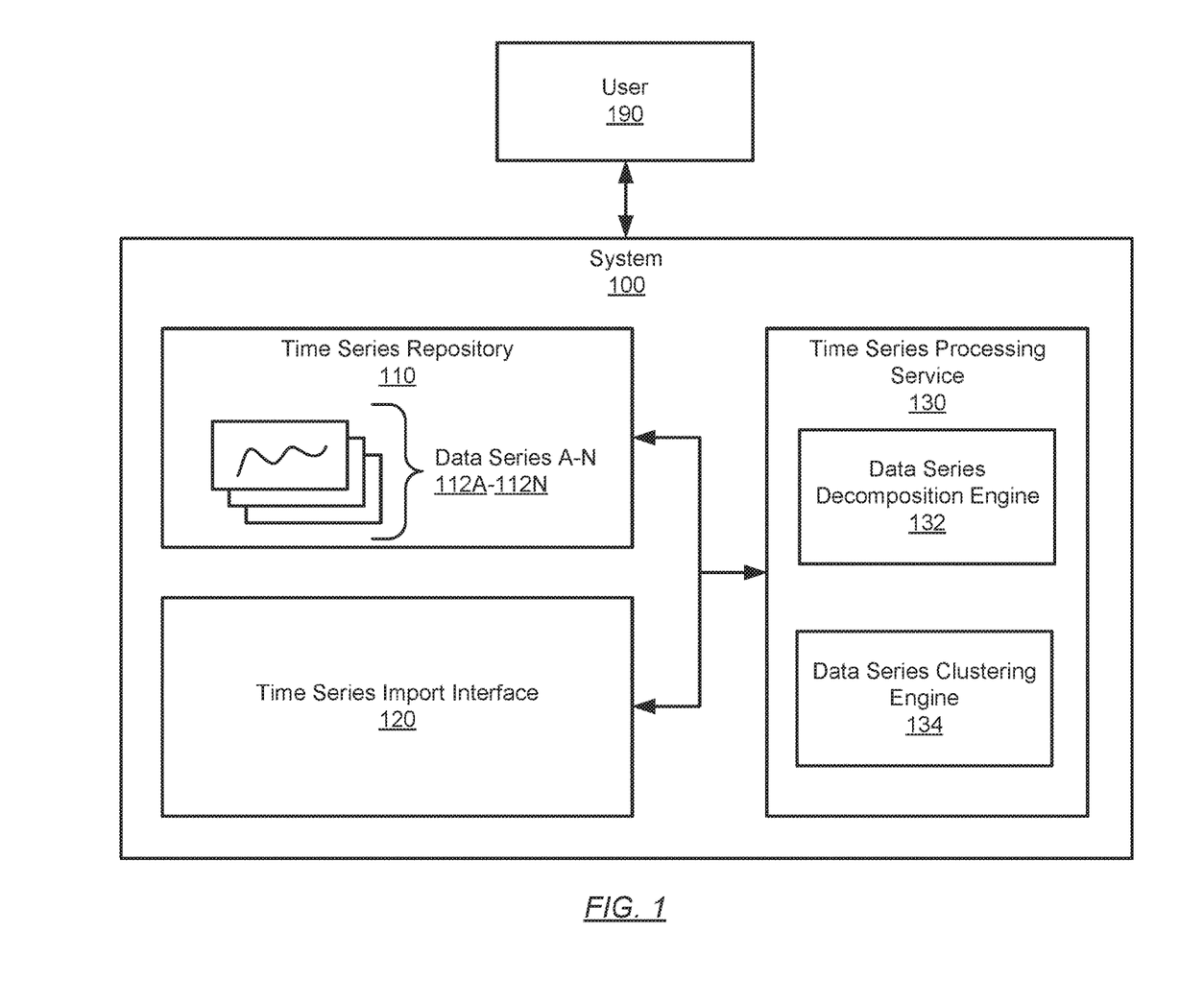
FIG. 1 shows a system for characterizing time series, in accordance with one or more embodiments of the disclosure.

Turning to FIG. 1, a system for characterizing time series, in accordance with one or more embodiments of the disclosure, is shown. The system (100) may include a time series repository (110), a time series import interface (120) and a time series processing service. Further, a user (190) who may interact with the system (100) is shown. Each of these components is described below.

The time series repository (110), in accordance with one or more embodiments of the disclosure, stores time series (112A-112N). A time series may include consecutive data points that describe the evolution of a process over time. A time series may capture, for example, an account balance, a production volume, an inventory, capital needs, fuel consumption, temperature, or any other variable that is tracked over time.

The database used for the time series repository (110) may be implemented using any format suitable for the storage of time series. For example, the database may be in the format of one or more tables, spreadsheets, or any other database format. The time series repository (110) may be stored in non-volatile or volatile memory, e.g. on a hard disk drive or in RAM.

The time series import interface (120), in accordance with one or more embodiments of the disclosure, is configured to obtain externally provided time series. The time series import interface (120) may include a user interface configured to enable a user (190) to provide a time series, e.g., by uploading a time series to the time series repository (120). The time series import interface (120) may additionally or alternatively include an interface to an external system, e.g., to a data acquisition system and/or an external computing system, from where time series may be acquired, either over time as time series values become available, or in batches.

The time series processing service (130), in accordance with one or more embodiments of the disclosure, includes a set of machine-readable instructions (stored on a computer-readable medium) which, when executed by the time series processing service (130) characterize time series. As previously noted, the characterization of a time series includes a decomposition of the time series and a clustering operation following the decomposition. The decomposition is performed by the time series decomposition engine (132) and the clustering operation is performed by the time series clustering engine (134) A detailed description of the operations performed by the time series processing service (130), the time series decomposition engine (132) and the time series clustering engine (134) is provided in the flowcharts of FIGS. 3 and 4.

The user (190), accessing the system (100) may be an operator initiating the characterization of a time series. The user may access the system (100) via a user interface. Alternatively, an external service, i.e., a service separate from the system (100) may initiate the characterization of a time series via a service interface provide, e.g., as an application programming interface (API).

Figure 6A:
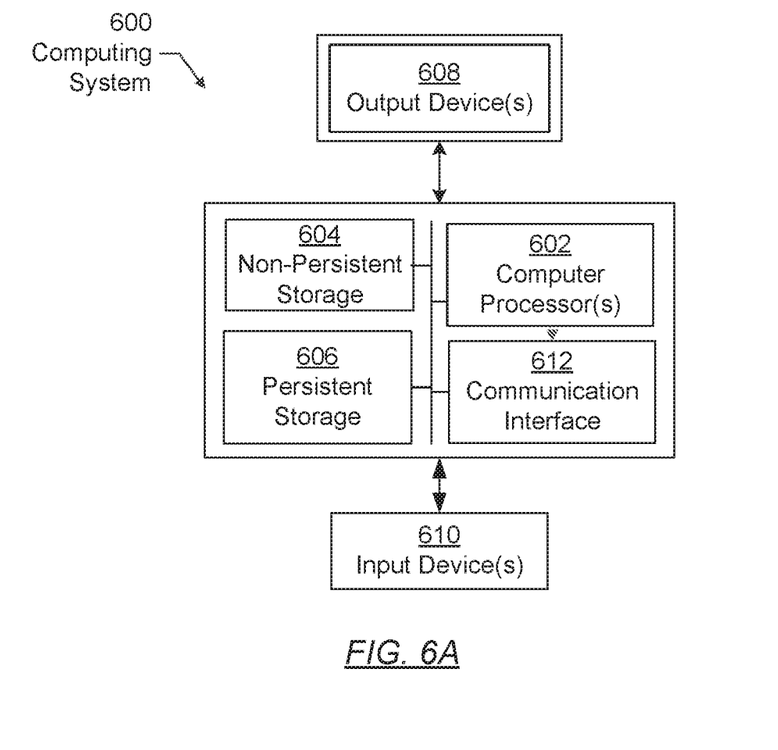
FIGS. 6A and 6B show computing systems in accordance with one or more embodiments of the disclosure.
Figure 6B:
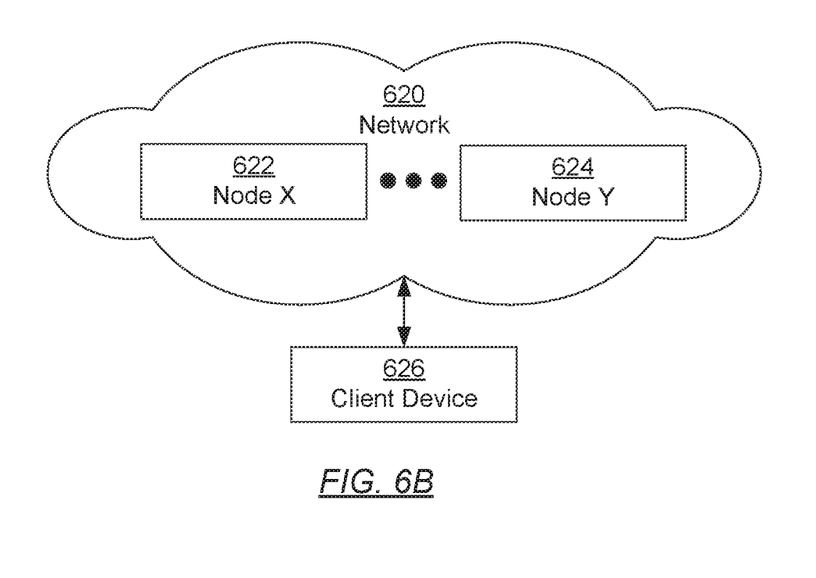

The components of the system (100), i.e., time series repository (110), the time series import interface (120) and the time series processing service (130) may be implemented on one or more computing systems that may be similar to the computing system introduced in FIGS. 6A and 6B.

While FIG. 1 shows a configuration of components, other configurations may be used without departing from the scope of the disclosure. For example, various components may be combined to create a single component. As another example, the functionality performed by a single component may be performed by two or more components that may be communicatively connected using a network connection.

Figure 2:
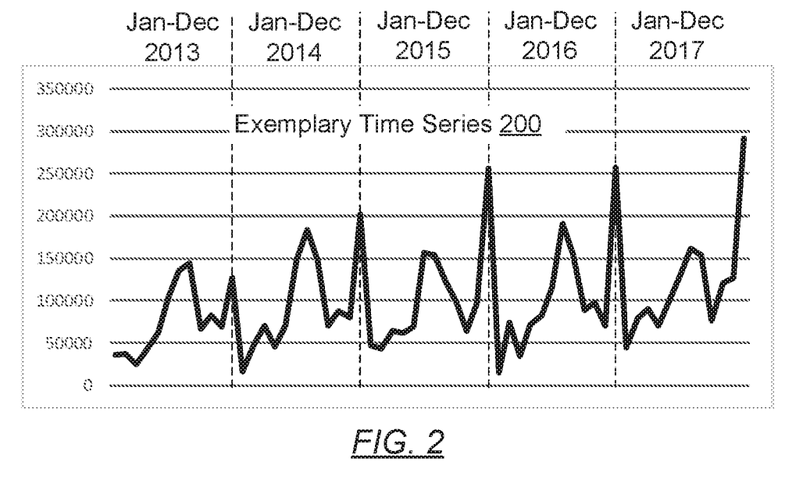
FIG. 2 shows an example of a time series, in accordance with one or more embodiments of the disclosure.

Turning to FIG. 2, an example for a time series, in accordance with one or more embodiments of the disclosure, is shown. The exemplary time series (200) includes data points captured over the years 2013-2017. One data point is obtained per month. Assume that each data point represents the monthly revenue of a small business. By visual inspection, it is apparent that the time series includes multiple features, including an upward trend and periodic oscillations. Separation of these components using a time series decomposition, in accordance with one or more embodiments of the disclosure, may make these features accessible for further processing and analysis, thus providing additional insights and enabling actionable recommendations.

Figure 3:
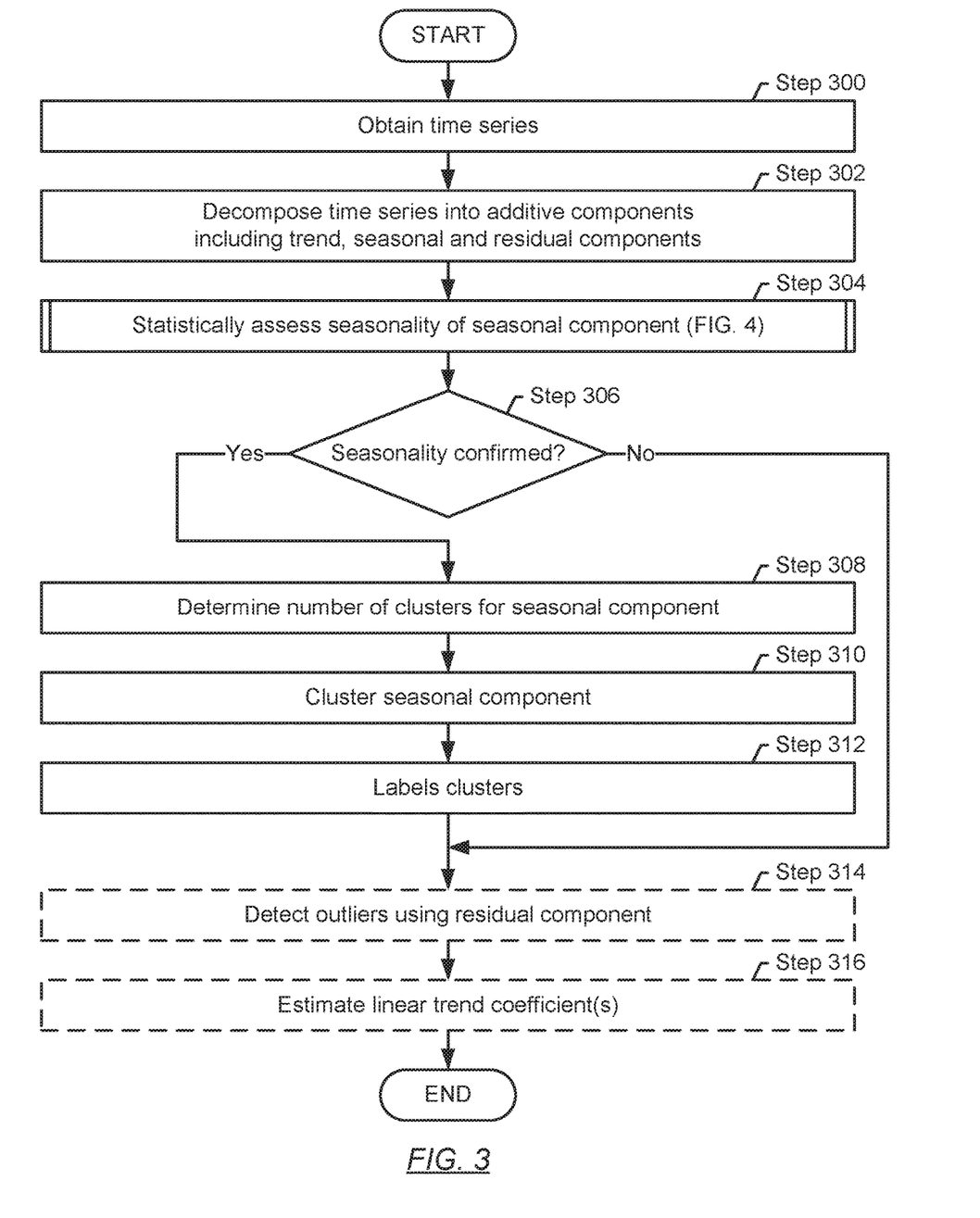
FIG. 3 shows a flowchart of a method for characterizing time series, in accordance with one or more embodiments of the disclosure.
Figure 4:
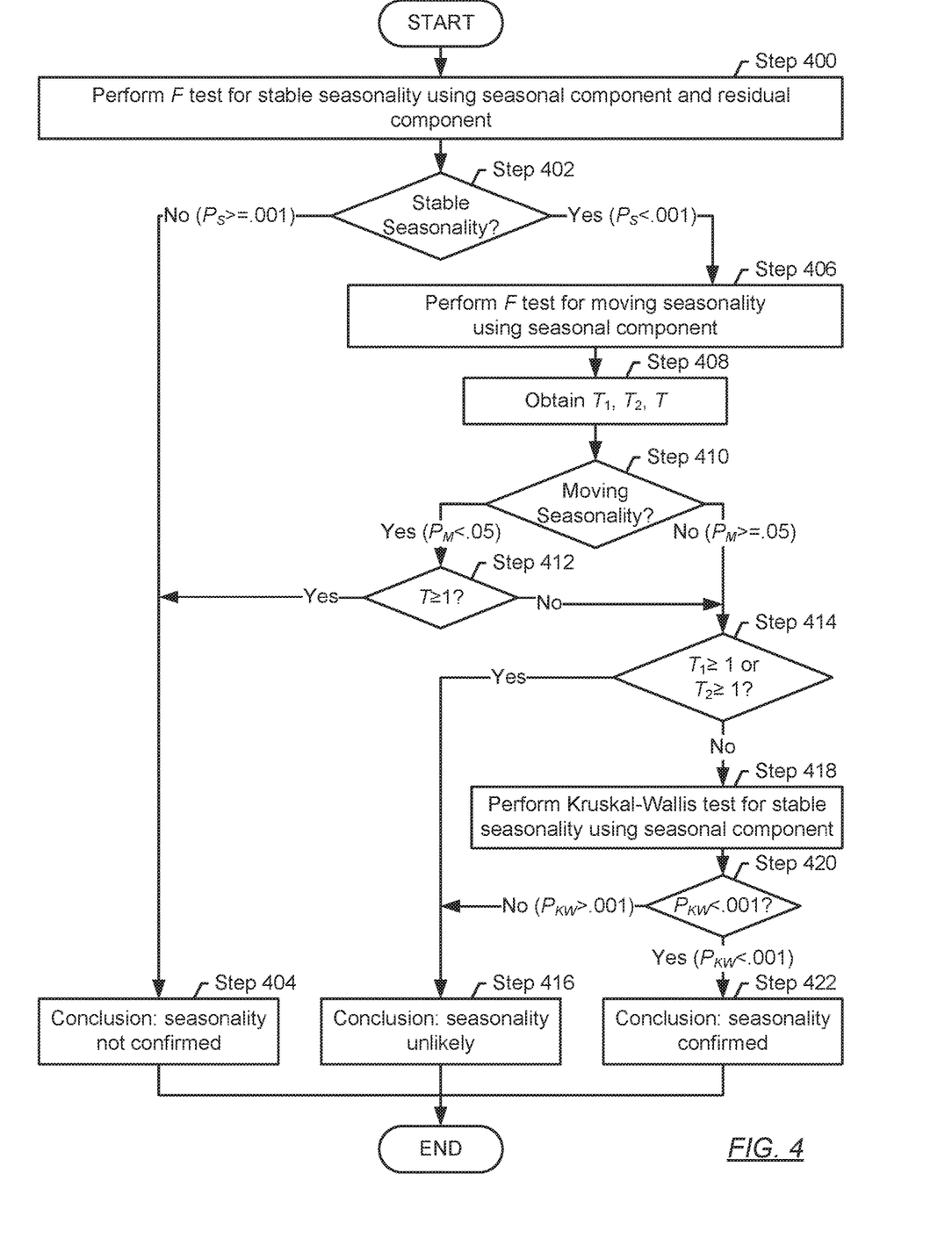
FIG. 4 shows a flowchart of a method for statistically assessing seasonality, in accordance with one or more embodiments of the disclosure.

FIGS. 3 and 4 show flowcharts in accordance with one or more embodiments of the disclosure. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Turning to FIG. 3, a method for characterizing time series, in accordance with one or more embodiments of the disclosure, is shown. The method describes the characterization of a single time series. If multiple time series are to be characterized, the method may be executed repeatedly, either simultaneously or sequentially. Broadly speaking, the method first identifies a seasonal component and subsequently assigns time intervals of the seasonal component to clusters. The seasonality may subsequently be described in a compact format, based on the assignment of the time intervals to the clusters. The steps of FIG. 3 are subsequently described. The results obtained from performing these steps are illustrated using an accompanying example. The raw data used for the example are shown in FIG. 2, and the various results obtained by performing the subsequently described steps are illustrated in FIGS. 5A-5D.

In Step 300, a time series is obtained. The time series may be obtained from a user or external process providing a time series or by selection of a time series stored in the time series repository. For the purpose of illustrating the subsequently performed steps using an example, assume that in Step 300, the time series shown in FIG. 2 is obtained.

Figure 5A:
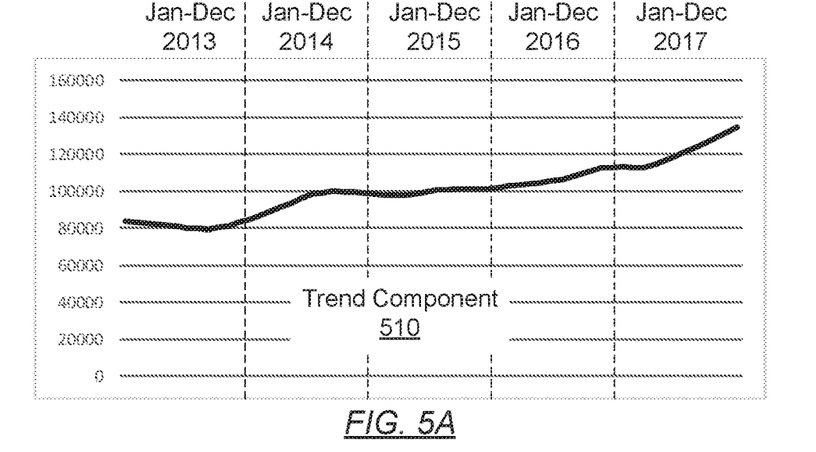
FIG. 5A shows an exemplary trend component, in accordance with one or more embodiments of the disclosure.
Figure 5B:
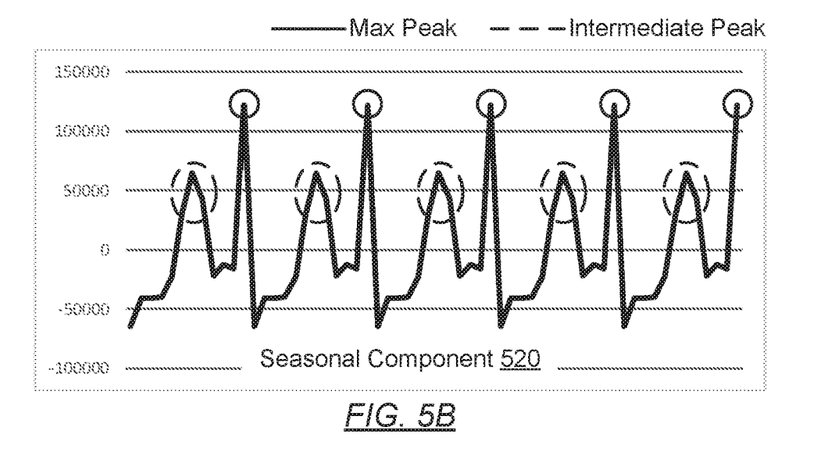
FIG. 5B shows an exemplary seasonal component, in accordance with one or more embodiments of the disclosure.
Figure 5C:
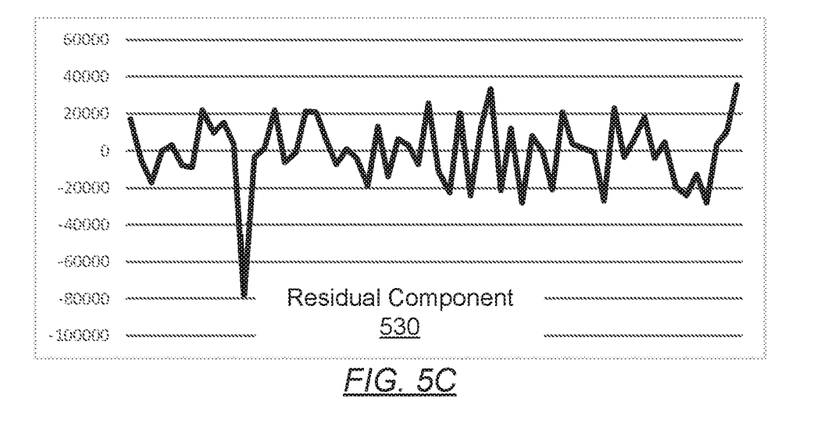
FIG. 5C shows an exemplary residual component, in accordance with one or more embodiments of the disclosure.

In Step 302, the time series is decomposed into additive components. The decomposition may separate the time series into a trend component, a seasonal component, and a residual component. The decomposition being performed, in accordance with an embodiment of the disclosure, may be a seasonal trend decomposition using Loess (STL). Using the STL method, the time series may be iteratively processed to obtain trend and seasonal components. With each iteration, the trend and seasonal components may be refined by adjusting smoothing and low-pass filtering settings. More specifically, when performing the smoothing, in one or more embodiments of the disclosure, local subsets of the time series are separately processed rather than performing the processing of the entire time series at once. Accordingly, only as small amount of memory and computing resources may be required to perform this operation. The time series is separated into local subsets, and for each of the local subsets a local smoothing may be performed by fitting a local model (e.g., a low-degree polynomial) to the local subset, while loaded into the memory of the computing system. After the fitting, a different local subset may be loaded into the memory to perform another local smoothing operation. A weighted least squares optimization may be used to perform the fitting. The combination of the obtained local models may establish an initial seasonal component which may then be detrended to obtain separate trend and seasonal components. The steps of smoothing and obtaining trend and seasonal components may be iteratively repeated to refine the obtained trend and seasonal components. Eventually, the residual component is obtained as the component of the time series that is not captured by the combination of the trend and the seasonal component. FIG. 5A shows the trend component obtained by performing Step 302 on the time series of FIG. 2. FIG. 5B shows the resulting seasonal component, and FIG. 5C shows the resulting residual component. Those skilled in the art will recognize that other decomposition methods, different from STL, may be used without departing from the disclosure. Further, while an additive decomposition of trend component, seasonal component and residual component is discussed, the described methods are equally applicable to multiplicatively combined trend, seasonal and residual components.

In Step 304, the seasonal component, obtained in Step 302 is statistically assessed for seasonality. The assessment may result in a conclusion that (i) the seasonality of the seasonal component could not be statistically confirmed, (ii) the seasonality of the seasonal component is considered statistically unlikely but possible, or (iii) the seasonality is statistically confirmed. The methods used for statistically assessing the seasonality are described with reference to FIG. 4.

In Step 306, a determination is made about whether the seasonality of the seasonal component is confirmed. The seasonality is assumed to be confirmed if execution of Step 304 statistically supports seasonality. If so, the method may proceed to Step 308. Alternatively, if seasonality is considered unlikely or not confirmed, the execution of the method may proceed with Step 314.

In Step 308, an appropriate number of clusters is determined for the seasonal component. Clusters, in accordance with one or more embodiments of the disclosure, are used to classify time intervals of the seasonality component. A cluster, in accordance with an embodiment of the disclosure, is selected to characterize time intervals based on the amplitude or level of the seasonality in the time intervals. For example, there may be a cluster for peaks in the seasonality component and another cluster for baseline level, if two clusters are used. In the example of the seasonal component of FIG. 5B, two different levels of peaks are identified. A maximum periodic peak level is indicated by the solid line circles, and an intermediate peak level is indicated by the dashed line circles. All other data points are considered baseline level. Accordingly, three clusters are used in the example of FIG. 5B (baseline level cluster, intermediate peak level cluster and maximum peak level cluster). Any number of clusters may be used in the subsequently performed clustering operation. For example, intermediate level clusters may be considered in addition to peak, baseline and/or trough level clusters without departing from the disclosure.

To determine the optimum number of clusters, the gap statistic method may be used. An optimal number of clusters, k, may thus be obtained by performing the following steps. First, for any k to be considered, an actual intra-cluster variation is determined after clustering the time interval data of the seasonal component. Similarly, for any k to be considered, a reference intra-cluster variation obtained from a null reference distribution with no obvious clustering is obtained. The k for which the distance between the reference intra-cluster variation and the actual intra-cluster variation is maximal is chosen as the optimal k, in accordance with an embodiment of the disclosure. Other methods for obtaining k may be used without departing from the disclosure. For example, k may be determined using the elbow or silhouette method.

Figure 5D:
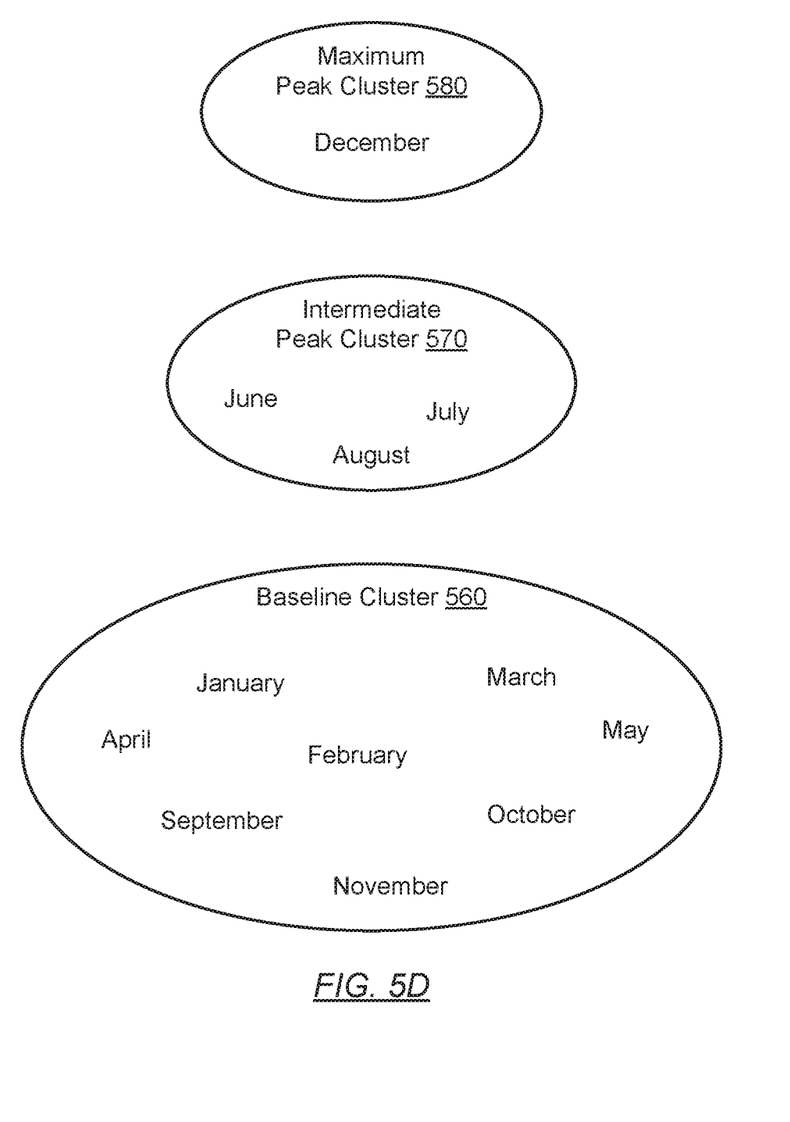
FIG. 5D shows a clustering of an exemplary seasonal component, in accordance with one or more embodiments of the disclosure.

In Step 310, a clustering of the seasonal component into k clusters is performed. The clustering may group the time intervals based on characteristics of these time intervals. More specifically, in one or more embodiments of the disclosure, the clustering results in the time intervals of the seasonal components being assigned to different clusters based on their amplitude or level. As previously noted, in the example discussed in conjunction with the method, three clusters are used. The clustering operation of Step 310 results in the month December being assigned to a first cluster, the months June, July and August being assigned to a second cluster, and the remaining months January-May and September-November being assigned to a third cluster, as illustrated in FIG. 5D.

A k-means clustering algorithm or any other clustering algorithm (e.g., a mixture model algorithm or a hierarchical clustering algorithm) may be used for the clustering operation of Step 310. The clustering operation, in accordance with an embodiment of the disclosure, also returns a geometric center for each cluster.

In Step 312, the clusters are labeled. In one embodiment of the disclosure, the labeling is performed based on the geometric centers of the clusters, obtained in Step 310. A label may be, for example, "maximum peak", "intermediate peak", "minimum trough", "intermediate trough", "baseline level" etc. The cluster to be labeled "baseline level" may be determined by selection of the cluster with the most time intervals assigned to it. In the current example, the cluster that contains the months January-May and September-November is the cluster with the most time intervals (i.e. months). Accordingly, this cluster is labeled "baseline", as shown in FIG. 5D.

The remaining labels are assigned based on the geometric centers of the remaining clusters relative to the geometric center of the baseline cluster. For example, the two remaining clusters in FIG. 5D are both at levels above the baseline cluster. The top cluster is, therefore, labeled "maximum peak", and the intermediate cluster is labeled "intermediate peak". While not shown, the results of the processing described in FIG. 3 may be represented in a compact format, for example, as a vector. The vector may include twelve elements. In the described example, the vector may be [0 0 0 0 0 1 1 1 0 0 0 2], with each vector element describing the consecutive twelve months of a year as either baseline (0), intermediate peak (1) or maximum peak (2). The vector may further include additional entries, e.g., a 3, 6, 9, 12 and/or 24-month trend. In addition, a flag may be included to indicate whether the seasonality was found to be statistically significant. Further, an entity ID (to indicate data association), and dates specifying the beginning and end of the time series, the number of clusters, etc. may be included.

In Step 314, an outlier detection may be optionally performed. The outlier detection, in accordance with an embodiment of the disclosure, establishes confidence intervals for the residual component. Data points that are outside the confidence interval may be considered outliers. These data points may be a result of unusual activity such as one-time events, but also typos (e.g., fat finger errors). The outlier detection may be performed on time series that do or do not include seasonality.

In Step 316, one or more linear trends coefficients are estimated. For example, linear trend coefficients may be obtained for the most recent 3, 6, 9, 12 and/or 24 month periods. These trend coefficients may be obtained, for example, by performing a linear regression on the trend component.

Turning to FIG. 4, a method for statistically assessing the seasonality of the seasonal component is described.

In Step 400, a test for stable seasonality is performed, using the previously obtained seasonal component and the previously obtained residual component. The test for stable seasonality may be an F-test that analyzes the variance of the seasonality component relative to the variance of the residual component. Based on an assumption that the seasonality component is associated with seasonal factors while the residual component is associated with irregular movements (e.g., noise or unmodeled events), the test checks if the variations of the seasonality are repetitive and regular enough to be reliably identified as being a result of seasonality.

The null-hypothesis of the F-test may be that the variance associated with the seasonality component is identical to the variance associated with the residual component. In other words, the null hypothesis may be that no seasonality is present in the seasonal component. The null hypothesis may be rejected if the variances are shown to be different at a certain significance level, e.g., $P_S<0.001$, which would indicate that seasonality is likely to exist in the seasonal component.

In Step 402, a determination is made about whether stable seasonality may be present in the seasonal component, or whether stable seasonality should be ruled out. If a determination is made that $P_S \geq 0.001$, the method may proceed to Step 404, where it is concluded that seasonality cannot be confirmed. Alternatively, if $P_S<0.001$, the method may proceed to Step 406 to perform additional steps to verify seasonality. Those skilled in the art will appreciate that the significance level threshold may be adjusted without departing from the disclosure.

In Step 406, a test for moving seasonality is performed, using the previously obtained seasonal component. Moving seasonality may be defined as gradual changes in the amplitude of the seasonal component, and a test for moving seasonality may be performed by decomposing the seasonality component into seasonality of different time scales and a residual seasonality. An F-test is subsequently performed to analyze the variance of the seasonality with the time scale of primary interest relative to the variance of the residual seasonality. In the example, the considered time scales are annual and monthly (or quarterly). Accordingly, the F-test, in the example, is performed using the variance of the annual seasonality and the variance of the residual seasonality.

In Step 408, variables $T_1$, $T_2$ and T are obtained. $T_1$ may be defined as $T_1=7/F_M$, with $F_M$ being the F-value obtained from the test for moving seasonality of Step 406. $T_2$ may be defined as $T_2=3F_M/F_S$, with $F_S$ being the F-value obtained from the test for stable seasonality of Step 400. T may be defined as $T=(T_1+T_2)/2$.

In Step 410, a determination is made about whether moving seasonality is assumed to be present in the seasonal component, based on the test for moving seasonality performed in Step 406. If a determination is made that $P_M<0.05$, it may be assumed that moving seasonality is present, and the execution of the method may proceed with Step 412. Alternatively, if a determination is made that $P_M \geq 0.05$, it may be concluded that no moving seasonality is present. The method may then continue with the execution of Step 414. Those skilled in the art will appreciate that $P_M$ may be adjusted without departing from the disclosure.

In Step 412, a determination is made about whether $T \geq 1$. If $T \geq 1$, the execution of the method proceeds with Step 404, where it is concluded that the seasonality could not be confirmed. If $T<1$, the method may proceed to Step 414.

In Step 414, a determination is made about whether $T_1 \geq 1$ or $T_2 \geq 1$. If $T_1 \geq 1$ or $T_2 \geq 1$, the execution of the method may proceed with Step 416, where it is concluded that seasonality is unlikely. If $T_1<1$ and $T_2<1$, the method may proceed to Step 418.

In Step 418, a Kruskal-Wallis test for stable seasonality is performed. The null hypothesis of the test may state that all months (or quarters) of the seasonal component have the same mean. If a determination is made that the significance level $P_{KW} \geq 0.001$, the method may proceed to Step 416, where it is concluded that seasonality is unlikely. Alternatively, if $P_{KW}<0.001$, the method may proceed to Step 422 where it is concluded that the seasonality of the seasonal component is confirmed.

In the discussion of FIG. 4, a set of set of thresholds $P_S$, $P_M$ and $P_{KW}$ are proposed. Those skilled in the art will appreciate that different thresholds may be used without departing from the disclosure.

Turning to FIG. 5, examples in accordance with one or more embodiments of the disclosure are shown. The examples were referred to and are described in the paragraphs accompanying the flowcharts of FIG. 3. Briefly summarized, FIG. 5A shows an exemplary trend component (510), obtained from the exemplary time series (200) of FIG. 2 by performing Step 302 of FIG. 3. FIG. 5B shows an exemplary seasonal component (520), obtained from the exemplary time series (200) of FIG. 2 by performing Step 302 of FIG. 3. FIG. 5C shows an exemplary residual component (530), obtained from the exemplary time series (200) of FIG. 2 by performing Step 302 of FIG. 3. FIG. 5D shows a clustering and labeling of the seasonal component (520), obtained by performing Steps 310 and 312 of FIG. 3.

Various embodiments of the disclosure have one or more of the following advantages. Embodiments of the disclosure enable a compact characterization of a time series, e.g., in vector format. The vector representation of time intervals (e.g., months) facilitates time series data interpretation when inspected by either a process or by a human. The method is computationally efficient, in particular in comparison to other methods that may be used to extract seasonality, such as Fourier analysis. In particular, because the time series decomposition operates on a subset of data only, the method may operate on time series of any size while requiring limited computational resources such as memory and processing power. This may not be feasible when using alternative methods for time series decomposition that operate on the entire time series data set. Further, the time series decomposition performs well in presence of unevenly space data points or missing data points, unlike other methods. Embodiments of the disclosure are applicable to any data to be analyzed for seasonality or, broadly speaking, periodically repeating patterns, in time, space, etc. The method may be scaled to analyze many data sets. For example, in order to assess the financials of a business, one may apply the method to multiple bank accounts, production history, purchasing history, etc. Similarly, the method can be applied to pools of time series, and may process these time series in parallel.

The output of the method may be used by various parties. For example, a business owner may benefit from understanding the temporal patterns of his business in order to make strategic decisions. A third party may benefit by being able to assess risks and/or opportunities associated with potential customers. For example, a lender may offer or advertise a loan at exactly the time when a potential client has an increased need for capital.

Embodiments of the disclosure may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing time series, comprising:
obtaining a time series comprising data points for a plurality of consecutive time intervals;
decomposing the time series into a trend component, a seasonal component, and a residual component, the decomposing comprising performing a smoothing operation by:
segmenting the time series into local subsets of the time series; and
separately processing each of the local subsets of the time series by:
loading the local subset of the time series into a memory;
fitting a local model to the loaded local subset of the time series;
wherein the local models establish an initial seasonal component from which the trend component, the seasonal component and the residual component are obtained;
clustering the seasonal component into a number of clusters, wherein each of the plurality of consecutive time intervals is assigned to one of the clusters based on a level of the data points of the seasonality component in the time interval; and
performing a cluster labeling by:
labeling one of the clusters as baseline, based on the cluster labeled as baseline comprising more time intervals than any one of the other clusters;
determining cluster labels for the other clusters based on a level of geometric centers of the other clusters relative to a level of a geometric center of the cluster labeled as baseline; and
for each time interval, storing the corresponding cluster label in a vector.

2. The method of claim 1, further comprising:
prior to clustering the seasonal component, statistically confirming that seasonality is present in the seasonal component.

3. The method of claim 1, further comprising:
determining the number of clusters using a gap statistic method.

4. The method of claim 1, wherein the clustering the seasonal component is performed using k-means clustering.

5. The method of claim 1, wherein the time series is additively decomposed into the trend component, the seasonal component, and the residual component.

6. The method of claim 1, wherein the decomposing the time series comprises applying a seasonal trend decomposition based on Loess (STL).

7. The method of claim 1, wherein the time interval is selected from a group consisting of a month and a quarter.

8. The method of claim 1, further comprising:
detecting outliers in the time series, comprising obtaining a confidence interval for the residual component and identifying the outliers as data points that are beyond the confidence interval.

9. A system for characterizing time series, the system comprising:
a hardware processor and memory; and
software instructions stored in the memory, which when executed by the hardware processor, cause the hardware processor to:
obtain a time series comprising data points for a plurality of consecutive time intervals;
decompose the time series into a trend component, a seasonal component, and a residual component, the decomposing comprising performing a smoothing operation by:
segmenting the time series into local subsets of the time series; and
separately processing each of the local subsets of the time series by:
loading the local subset of the time series into the memory, and
fitting a local model to the loaded local subset of the time series,
wherein the local models establish an initial seasonal component from which the trend component, the seasonal component and the residual component are obtained;
cluster the seasonal component into a number of clusters, wherein each of the plurality of consecutive time intervals is assigned to one of the clusters based on a level of the data points of the seasonality component in the time interval; and
perform a cluster labeling by:
labeling one of the clusters as baseline, based on the cluster labeled as baseline comprising more time intervals than any one of the other clusters;
determining cluster labels for the other clusters based on a level of geometric centers of the other clusters relative to a level of a geometric center of the cluster labeled as baseline; and
for each time interval, storing the corresponding cluster label in a vector.

10. The system of claim 9, wherein the software instructions further cause the hardware processor to, prior to clustering the seasonal component, statistically confirm that seasonality is present in the seasonal component.

11. The system of claim 9, wherein the software instructions further cause the hardware processor to determine the number of clusters using a gap statistic method.

12. The system of claim 9, wherein the clustering the seasonal component is performed using k-means clustering.

13. The system of claim 9, wherein the decomposing the time series comprises applying a seasonal trend decomposition based on Loess (STL).

14. The system of claim 9, wherein the software instructions further cause the hardware processor to detect outliers in the time series, comprising obtaining a confidence interval for the residual component and identifying the outliers as data points that are beyond the confidence interval.

15. A non-transitory computer readable medium comprising computer readable program code for causing a computer system to:
obtain a time series comprising data points for a plurality of consecutive time intervals;
decompose the time series into a trend component, a seasonal component, and a residual component, the decomposing comprising performing a smoothing operation by:
segmenting the time series into local subsets of the time series; and
separately processing each of the local subsets of the time series by:
loading the local subset of the time series into a memory, and
fitting a local model to the loaded local subset of the time series,
wherein the local models establish an initial seasonal component from which the trend component, the seasonal component and the residual component are obtained;
cluster the seasonal component into a number of clusters, wherein each of the plurality of consecutive time intervals is assigned to one of the clusters based on a level of the data points of the seasonality component in the time interval;
perform a cluster labeling by:
labeling one of the clusters as baseline, based on the cluster labeled as baseline comprising more time intervals than any one of the other clusters;
determining cluster labels for the other clusters based on a level of geometric centers of the other clusters relative to a level of a geometric center of the cluster labeled as baseline; and
for each time interval, storing the corresponding cluster label in a vector.

16. The non-transitory computer readable medium of claim 15, wherein the computer readable program code further causes the computer system to, prior to clustering the seasonal component, statistically confirm that seasonality is present in the seasonal component.

17. The non-transitory computer readable medium of claim 15, wherein the computer readable program code further causes the computer system to determine the number of clusters using a gap statistic method.

18. The non-transitory computer readable medium of claim 15, wherein the clustering the seasonal component is performed using k-means clustering.

19. The non-transitory computer readable medium of claim 15, wherein the decomposing the time series comprises applying a seasonal trend decomposition based on Loess (STL).

20. The non-transitory computer readable medium of claim 15, wherein the computer readable program code further causes the computer system to detect outliers in the time series, comprising obtaining a confidence interval for the residual component and identifying the outliers as data points that are beyond the confidence interval.

* * * * *